US011892869B2

(12) United States Patent
Wang (10) Patent No.: US 11,892,869 B2
(45) Date of Patent: Feb. 6, 2024

(54) CLOCK GENERATOR DEVICE AND CLOCK GENERATION METHOD

(71) Applicant: SigmaStar Technology Ltd., Fujian (CN)

(72) Inventor: Wei-Ping Wang, Zhubei (TW)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 135 days.

(21) Appl. No.: 17/539,363

(22) Filed: Dec. 1, 2021

(65) Prior Publication Data

US 2023/0025363 A1  Jan. 26, 2023

(30) Foreign Application Priority Data

Jul. 23, 2021  (CN) .......................... 202110838951.6

(51) Int. Cl.
*G06F 1/12* (2006.01)
*G06F 1/06* (2006.01)

(52) U.S. Cl.
CPC ...................................... *G06F 1/06* (2013.01)

(58) Field of Classification Search
CPC ........................................................ G06F 1/06
See application file for complete search history.

(56) References Cited

U.S. PATENT DOCUMENTS

| 5,475,324 | A * | 12/1995 | Tomiyori | G06F 1/08 331/49 |
| 5,745,774 | A * | 4/1998 | Munetsugu | G06F 1/3203 713/400 |
| 6,473,852 | B1 * | 10/2002 | Hanjani | G06F 1/24 327/143 |
| 6,674,623 | B1 * | 1/2004 | Abe | H02H 5/044 361/103 |
| 8,854,086 | B1 * | 10/2014 | Bal | G06F 1/324 327/143 |
| 8,884,683 | B1 * | 11/2014 | Helms | G06F 1/329 327/534 |
| 2005/0030112 | A1 * | 2/2005 | Kosuda | G06F 3/0362 331/46 |
| 2005/0138444 | A1 * | 6/2005 | Gaskins | G06F 1/3203 713/300 |
| 2008/0094108 | A1 * | 4/2008 | Leon | G01S 19/35 327/99 |
| 2008/0174354 | A1 * | 7/2008 | Yu | G06F 1/04 327/298 |
| 2008/0224752 | A1 * | 9/2008 | Lee | G06F 1/324 327/292 |
| 2020/0089299 | A1 * | 3/2020 | Kim | H03L 7/097 |

* cited by examiner

*Primary Examiner* — Phil K Nguyen
(74) *Attorney, Agent, or Firm* — Edell, Shapiro & Finnan, LLC (57) ABSTRACT

A clock generator device includes a first clock generator circuit, a second clock generator circuit, a detector circuit and a selection circuit. The first clock generator circuit has a first starting voltage and generates a first clock signal in response to a supply voltage. The second clock generator circuit has a second starting voltage and generates a second clock signal in response to the supply voltage. The detector circuit detects the second clock signal to generate a validation signal. The selection circuit selectively outputs one of the first clock signal and the second clock signal according to the validation signal. The first starting voltage is lower than the second starting voltage.

8 Claims, 7 Drawing Sheets

CLOCK GENERATOR DEVICE AND CLOCK GENERATION METHOD

This application claims the benefit of China application Serial No. CN202110838951.6, filed on Jul. 23, 2021, the subject matter of which is incorporated herein by reference.

BACKGROUND OF THE INVENTION

Field of the Invention

The invention relates to a clock generator device, and more particularly to a clock generator device and a clock generating method capable of reducing a system boot time.

Description of the Related Art

After system boot in some applications needing a real-time clock (RTC), digital circuits in the system need stable clock signals in order to start operating. However, the operating voltage of a common oscillator circuit is rather high. When the supply voltage has not yet reached the minimum operating voltage of the oscillator circuit, the oscillator circuit cannot provide an appropriate clock signal. Thus, these digital circuits can obtain appropriate clock signals only after the level of supply voltage has reached the minimum operating voltage. As a result, these digital circuits can only starting operating when a certain waiting time has elapsed from the system boot, and this fails to satisfy application scenarios in which quick system start is needed.

SUMMARY OF THE INVENTION

In some embodiments, a clock generator device includes a first clock generator circuit, a second clock generator circuit, a first detector circuit and a selection circuit. The first clock generator circuit has a first starting voltage, and generates a first clock signal in response to a supply voltage. The second clock generator circuit has a second starting voltage, and generates a second clock signal in response to the supply voltage. The first detector circuit detects the second clock signal to generate a validation signal. The selection circuit selectively outputs one of the first clock signal and the second clock signal according to the validation signal. The first starting voltage is lower than the second starting voltage.

In some embodiments, a clock generation method includes: generating a first clock signal by a first clock generator circuit in response to a supply voltage, wherein the first clock generator circuit has a first starting voltage; generating a second clock signal by a second clock generator circuit in response to the supply voltage, wherein the second clock generator circuit has a second starting voltage, and the first starting voltage is lower than the second starting voltage; detecting the second clock signal to generate a validation signal; and selectively outputting one of the first clock signal and the second clock signal according to the validation signal.

In some embodiments, a clock generator device includes a first clock generator circuit, a second clock generator circuit, a first detector circuit and a selection circuit. The first clock generator circuit generates a first clock signal when a supply voltage is greater than or equal to a first level. The second clock generator circuit generates a second clock signal when the supply voltage is greater than or equal to a second level, wherein the first level is lower than the second level. The detector circuit detects the second clock signal to generate a validation signal. The selection circuit selectively outputs one of the first clock signal and the second clock signal according to the validation signal.

Features, implementation and effects of the disclosure are described in detail in the preferred embodiments with the accompanying drawings below.

DETAILED DESCRIPTION OF THE INVENTION

All terms used in the literature have common significances. The definitions of the terms in common dictionaries, and the use any of the terms discussed here in the content of the disclosure are only exemplary, and are not to be interpreted as limitations to the scope and significances of the disclosure. Similarly, the disclosure is not limited by the various embodiments given in the description.

The term "coupled" or "connected" may refer to a mutual direct physical or electrical contact of two or more components, or a mutual indirect physical or electrical contact, or may refer to a mutual operation or action of two or more components. As used in the literature, the term "circuit" may be a device in which at least one transistor and/or at least one active and passive component are connected in a certain way so to process signals.

Figure 1A:
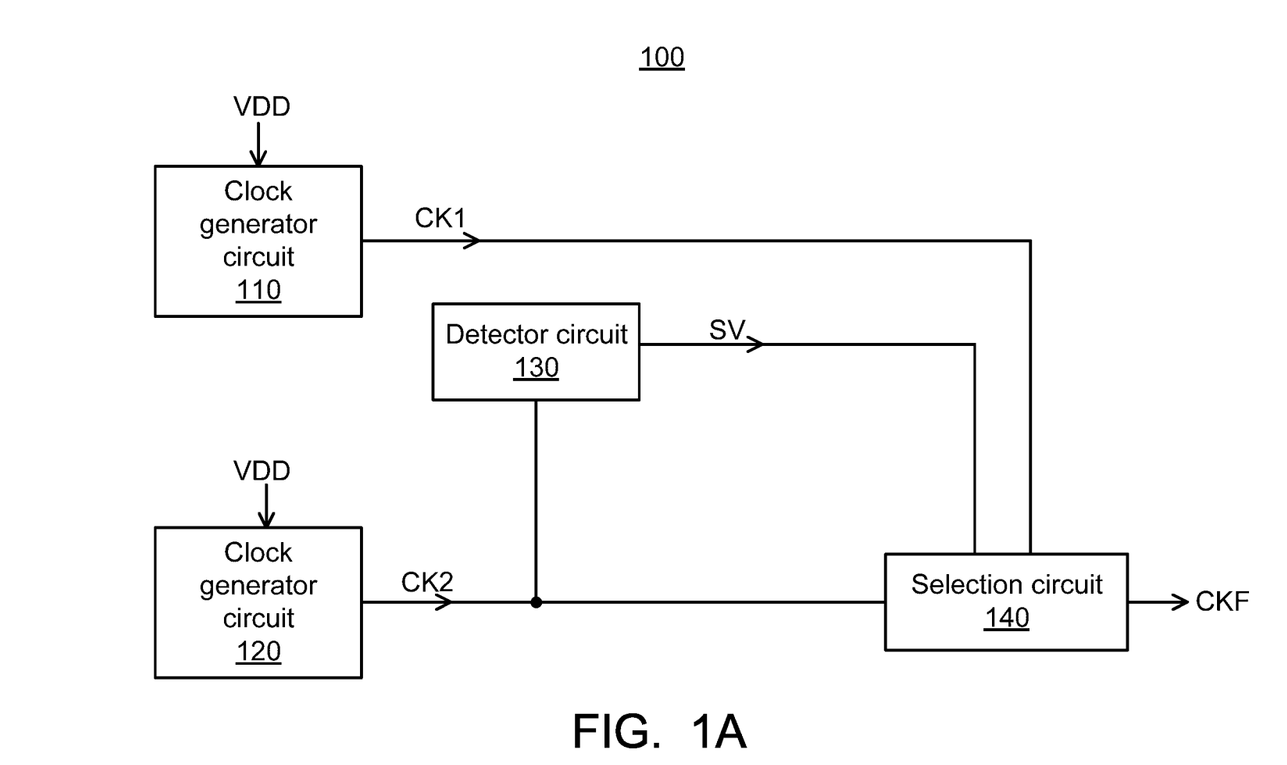
FIG. 1A is a schematic diagram of a clock generator device according to some embodiments of the disclosure.

FIG. 1A shows a schematic diagram of a clock generator device 100 according to some embodiments of the disclosure. In some embodiments, the clock generator device 100 is applicable to an image processing chip. For example, the clock generator device 100 may provide a final clock signal CLK to a surveillance chip to enable the surveillance chip to be activated by a shorter boot time in order to start monitoring the environment.

The clock generator device 100 includes a clock generator circuit 110, a clock generator circuit 120, a detector circuit 130 and a selection circuit 140. In some embodiments, the clock generator circuit 110 has a first starting voltage, the clock generator circuit 120 has a second starting voltage, and the first starting voltage is lower than the second starting voltage. In some embodiments, the precision of a clock signal CK2 generated by the clock generator circuit 120 is higher than the precision of a clock signal CK1 generated by the clock generator circuit 110. In some embodiments, the frequency of the clock signal CK1 approximates (or is equal to) the frequency of the clock signal CK2.

For example, the clock generator circuit 110 may be, for example but not limited to, a free-running oscillator, and generates the clock signal CK1 in response to a supply voltage VDD. The clock generator circuit 120 may be, for example but not limited to, a quartz oscillator, and generates the clock signal CK2 in response to the supply voltage VDD. In some embodiments, the operating voltage of the clock generator circuit 110 is approximately within a range of 0.5 V to 3.3 V, and the operating voltage of the clock generator circuit 120 is approximately within a range of 0.9 V to 3.3 V. Hence, it is known that the first starting voltage of the clock generator circuit 110 is 0.5 V, and the second starting voltage of the clock generator circuit 120 is 0.9 V. When the supply voltage VDD is greater than or equal to the first starting voltage, the clock generator circuit 110 starts operating so as to generate the clock signal CK1. When the supply voltage VDD is greater than or equal to the second starting voltage, the clock generator circuit 120 starts operating so as to generate the clock signal CK2. With the configuration above, when the clock generator device 100 is powered on, the supply voltage VDD starts rising from a low voltage level, and because the first starting voltage is lower than the second starting voltage, a timing at which the clock generator circuit 110 generates the clock signal CK1 is earlier than a timing at which the clock generator circuit 120 generates the clock signal CK2.

Figure 2A:
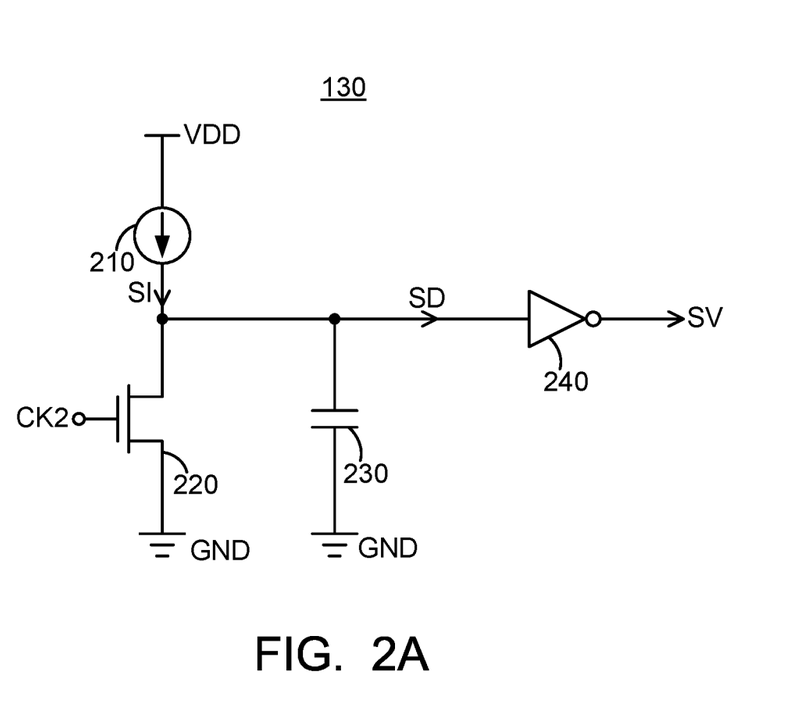
FIG. 2A is a schematic diagram of a detector circuit in FIG. 1A or FIG. 1B according to some embodiments of the disclosure.
Figure 2B:
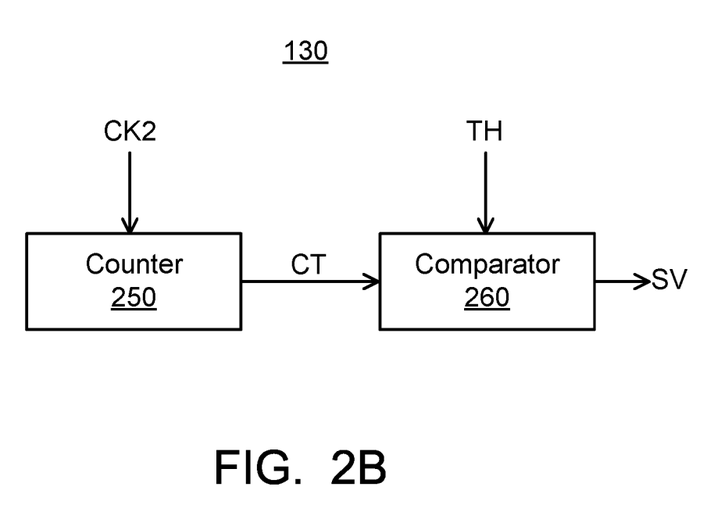
FIG. 2B is a schematic diagram of a detector circuit in FIG. 1A or FIG. 1B according to some embodiments of the disclosure.

The detector circuit 130 detects whether the clock signal CK2 is stable and detects whether characteristics (for example, frequency) of the clock signal CK2 are appropriate so as to generate a validation signal SV. In some embodiments, as shown in FIG. 2A, the detector circuit 130 may be implemented by an analog circuit. In some embodiments, as shown in FIG. 2B, the detector circuit 130 may be implemented by a digital circuit. In some embodiments, the detector circuit 130 may be implemented by a mixed-signal circuit.

The selection circuit 140 selectively outputs one of the clock signal CK1 and the clock signal CK2 as a final clock signal CKF according the validation signal SV. For example, when the clock generator device 100 is powered on, the supply voltage VDD starts rising. When the supply voltage VDD is greater than or equal to the first starting voltage, the clock generator circuit 110 starts operating to generate the clock signal CK; at this point, the clock generator circuit 120 is not yet started. Under such condition, the detector circuit 130 outputs the validation signal SV having a first logic value (for example, logic value 0). The selection circuit 140 may selectively output the clock signal CK1 as the final clock signal CKF according to the validation signal SV. When the supply voltage VDD is greater than or equal to the second starting voltage, the clock generator circuit 120 starts operating so as to output the clock signal CK2. Under such condition, the detector circuit 130 outputs the validation signal SV having a second logic value (for example, logic value 1). The selection circuit 140 may selectively output the clock signal CK2 as the final clock signal CKF according to the validation signal SV. With the configuration above, the clock generator device 100 can more quickly provide the final clock signal CKF during a boot process, so as to accelerate operation start timings of other circuits in the system. In some embodiments, the selection circuit 140 may be a multiplexer circuit.

Figure 1B:
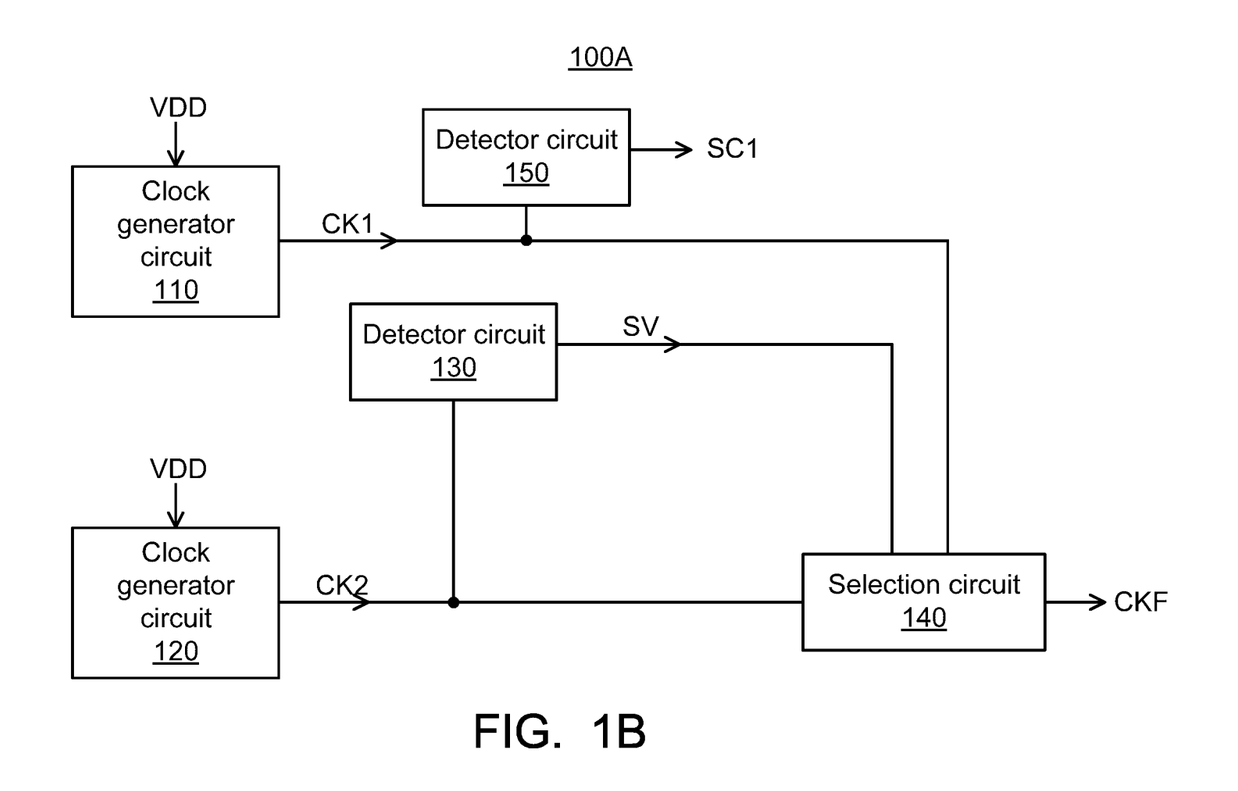
FIG. 1B is a schematic diagram of a clock generator device according to some embodiments of the disclosure.

FIG. 1B shows a schematic diagram of a clock generator device 100A according to some embodiments of the disclosure. Compared to FIG. 1A, the clock generator device 100A in FIG. 1B further includes a detector circuit 150, which determines whether the clock generator circuit 110 has started to output the clock signal CK1 so as to generate a control signal SC1. In some embodiments, the control signal CS1 may be used to enable a peripheral circuit (not shown) in the system. For example, when the clock generator circuit 110 starts to output the clock signal CK1, the control signal SC1 switches from a first logic value to a second logic value. In response to the control signal CS1, a power-on control circuit in the system is enabled to start powering a peripheral circuit. Thus, the peripheral circuit is allowed to more quickly start operating.

FIG. 2A is a schematic diagram of the detector circuit 130 in FIG. 1A or FIG. 1B according to some embodiments of the disclosure. The detector circuit 130 includes a current source 210, a switch 220, a capacitor 230 and an inverter 240.

A first terminal of the current source 210 receives the supply voltage VDD, and a second terminal of the current source 210 is coupled to a first terminal of the switch 220. A second terminal of the switch 220 receives a ground voltage GND, and a control terminal of the switch 220 receives the clock signal CK2. A first terminal of the capacitor 230 is coupled to the second terminal of the current source 210, and a second terminal of the capacitor 230 receives the ground voltage GND. An input terminal of the inverter 240 is coupled to the first terminal of the capacitor 230, and an output terminal of the inverter 240 is for outputting the validation signal SV. The current source 210 is for providing a current signal SI. The switch 220 is selectively turned on according to the clock signal CK2. The capacitor 230 is charged by the current signal SI and is discharged via the switch 220 so as to generate a detection signal SD. The inverter 240 outputs the validation signal SV according to the detection signal SD.

More specifically, when the clock generator circuit 120 has not yet generated the clock signal CK2, the switch 220 is turned off, and the capacitor 230 is charged by the current signal SI so as to generate the detection signal SD having a high level. In response to the detection signal SD, the inverter 240 outputs the validation signal SV having a low level (corresponding to the logic value 0). Alternatively, as the clock generator circuit 120 starts to generate an appropriate clock signal CK2, it means that the clock signal CK2 is stable and has a certain number of pulses. In response to these sequential pulses, the switch 220 is turned on such that the capacitor 230 starts to discharge, so as to generate the detection signal SD having a low level. In response to the detection signal SD, the inverter 240 outputs the validation signal SV having a high level (corresponding to the logic value 1). Thus, the validation signal SV may be used to indicate whether the clock generator circuit 120 stably generates the appropriate clock signal CK2.

In this example, a capacitance value C of the capacitor C may be used to adjust a timing at which the validation signal SV having a high level is generated, further setting a timing of switching (to be referred to as a switching timing T) from the output clock signal CK1 to the second clock signal CK2. In some embodiments, the switching timing T may be determined according to application requirements of the clock signal CK2. For example, the switching timing T may be determined according to the frequency needed by the clock signal CK2.

In some embodiments, the switching timing T and the capacitance value C satisfy the equation below:

$$Q = C \times VDD = I \times T$$
$$T = \frac{C \times VDD}{I} = M \times T_{CK2} \times 2,$$

wherein, the supply voltage VDD may be within a voltage range corresponding to the second starting voltage, Q is the amount of charge stored in the capacitor 230, I is a discharging current of the capacitor 230, $T_{CK2}$ is a period of the clock signal CK2, and M is a predetermined value. The equation above indicates that capacitor C is discharged during a predetermined period (corresponding to a period of M clock signals CK2) such that the level at the first terminal of the capacitor C becomes the ground voltage GND. According to the equation above, the capacitance value C of the capacitor 230 or the current signal SI (which affects the discharging current I of the capacitor C) may be adjusted to set the switching timing T.

FIG. 2B shows a schematic diagram of the detector circuit 130 in FIG. 1A or FIG. 1B according to some embodiments of the present invention. The detector circuit 130 includes a counter 250 and a comparator 260. The counter 250 counts the clock signal CK2 to generate a counter value CT. In some embodiments, the counter 250 may be an up counter, a down counter, a ripple counter or other types of counters. The comparator 260 outputs the validation signal SV when the counter value is equal to a threshold TH.

For example, the counter 250 is an up counter, and counts up in response to one pulse of the clock signal CK2 so as to generate the counter value CT. When the counter value CT increases to be equal to the threshold TH, it means that the clock generator circuit 120 is capable of stably generating the output clock signal CK2. Under such condition, the comparator 260 outputs the validation signal SV having a specific logic value. Compared to FIG. 2A, in this example, the threshold TH may be adjusted to set the frequency and level of stability of the clock signal CK2.

In some embodiments, the detector circuit 150 has a similar or same circuit configuration as the detector circuit 130. The configuration of the detector circuit 150 may be referred from FIG. 2A or FIG. 2B, and such repeated details are omitted herein. If the detector circuit 150 is implemented by the example in FIG. 2A, the supply voltage VDD in the equation above may be in a voltage range corresponding to the operating voltage of the clock generator circuit 110. Alternatively, if the detector circuit 150 is implemented by the example in FIG. 2B, a threshold TH used by the detector circuit 150 may be different from the threshold TH used by the detector circuit 130.

Figure 3:
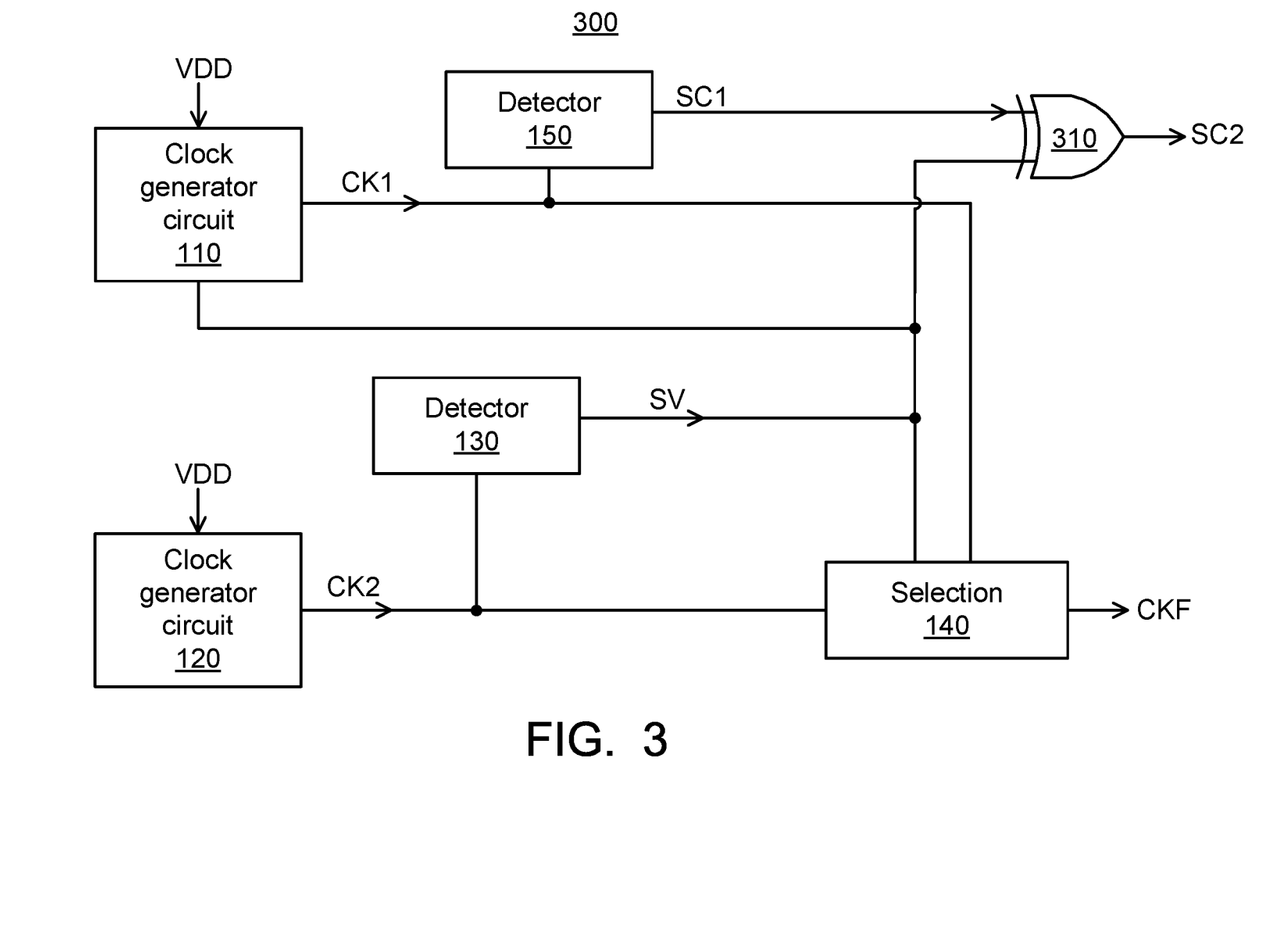
FIG. 3 is a schematic diagram of a clock generator device according to some embodiments of the disclosure.

FIG. 3 shows a schematic diagram of a clock generator device 300 according to some embodiments of the present invention. Compared to FIG. 1B, in this example, the validation signal SV may be used to control the clock generator circuit 110. For example, the clock generator circuit 110 is a ring oscillator circuit having power gating, and may be enabled or disabled according to the validation signal SV.

In some embodiments, the initial value of the validation signal SV is a first logic value. In response to the validation signal SV having the first logic value, the clock generator circuit 110 is enabled so as to start generating the clock signal CK1 according to the supply voltage VDD. When the clock generator device 300 is powered on, the supply voltage VDD starts rising from a zero level to a predetermined level. When the supply voltage VDD is higher than or equal to the first starting voltage, the clock generator circuit 110 starts to generate the lock signal CK1. In response to the validation signal SV having the first logic value, the selection circuit 140 selectively outputs clock signal CK1 as the final clock signal CKF. When the supply voltage VDD is higher than or equal to the second starting voltage, the clock generator circuit 120 starts to generate the clock signal CK2.

The detector circuit 130 determines that the clock generator circuit 120 is capable of stably generating the appropriate clock signal CK2 and generates the validation signal SV having the second logic value. In response to the validation signal SV having the second logic value, the selection circuit 140 switches to output the clock signal CK2 as the final clock signal CKF. On the other hand, the clock generator circuit 110 may be turned off in response to the validation signal SV having the second logic value so as to save system power consumption. When the clock generator circuit 110 is turned off, the clock generator circuit 110 stops outputting the clock signal CK1. Under such condition, the detector circuit 150 outputs the control signal SC1 having the first logic value.

Moreover, compared to FIG. 1B, the clock generator device 300 further includes a logic gate circuit 310. The logic gate circuit 310 generates a control signal SC2 according to the validation signal SV and the control signal S1. The control signal SC2 may be used to control to a digital circuit in the system. For example, the control signal SC2 may be used to control a power control circuit so as to decide whether or not to power the digital circuit.

In some embodiments, the gate logic circuit 130 may be, for example but not limited to, an XOR gate circuit. When the supply voltage VDD is supplied, the clock generating circuit 110 first outputs the clock signal CK1 (compared to the clock generator circuit 120). Under such condition, the control signal SC1 has a second logic value and the validation signal SV has a first logic value. In response to the control signal SC1 and the validation signal SV, the logic gate circuit 310 generates the second control signal SC2 having the second logic value. The power control circuit may power a digital circuit in response to the control signal CS2. When the clock generator circuit 120 outputs the appropriate clock signal CK2, the detector circuit 130 outputs the validation signal SV having the second logic value. Under such condition, the clock generator circuit 110 is turned off and stops outputting the clock signal CK1, and the detector circuit 150 accordingly outputs the control signal SC1 having the first logic value. In response to the validation signal SV and the control signal SC1, the gate logic circuit 310 generates the control signal SC2 having the second logic value, and the power control circuit may continually power the digital circuit.

Figure 4A:
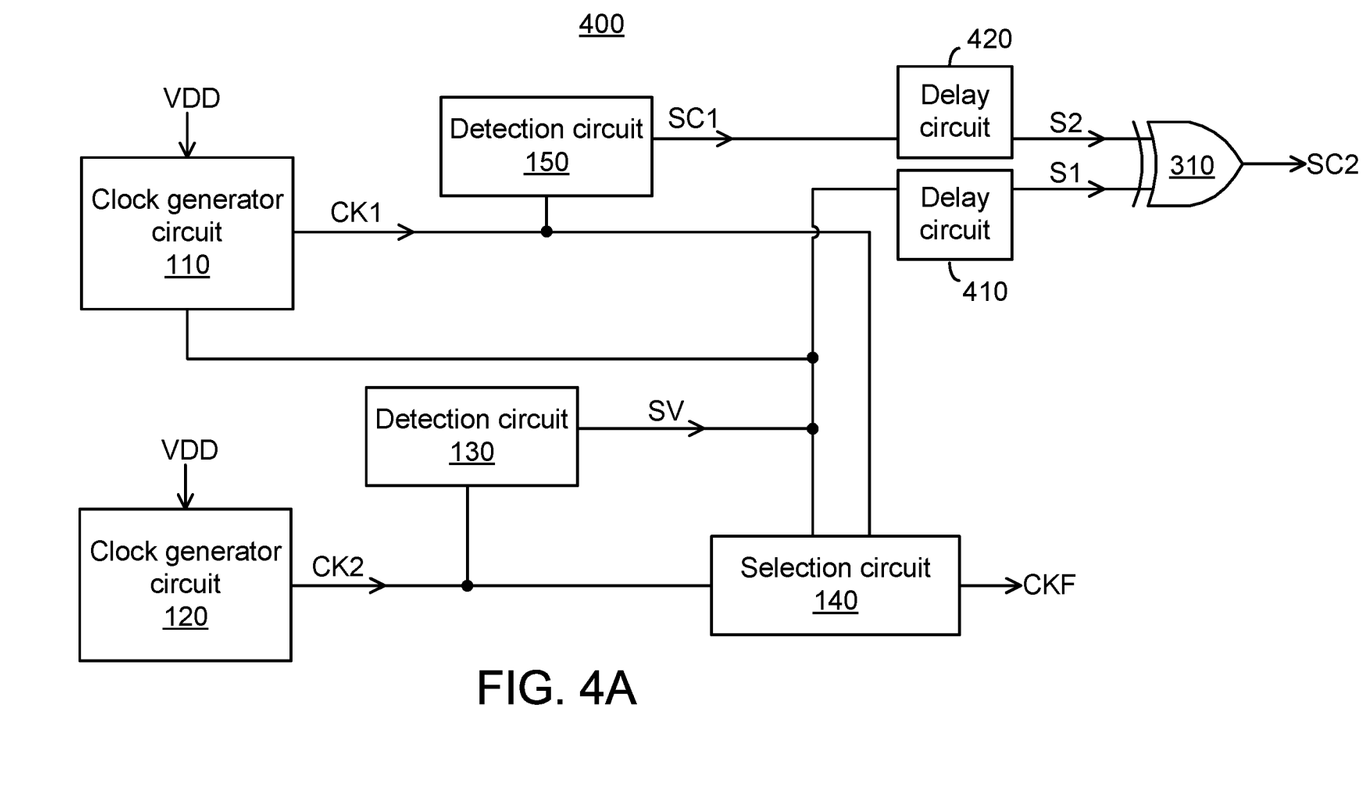
FIG. 4A is a schematic diagram of a clock generator device according to some embodiments of the disclosure.

FIG. 4A is a schematic diagram of a clock generator device 400 according to some embodiments of the present invention. Compared to the clock generator device 300 in FIG. 3, the clock generator device 400 further includes a delay circuit 410 and a delay circuit 420. The delay circuit 410 delays the validation signal SV to generate a signal S1. The delay circuit 420 delays the control signal SC1 to generate a signal S2. The gate logic circuit 310 generates the control signal SC2 according to the signal S1 and the signal S2. In some embodiments, the delay time of the delay circuit 420 may be less than the delay time of the delay circuit 410. In this example, the control signal SC2 may be used to control a digital circuit related to an application of a real-time clock (RTC). For example, the digital circuit may include a flip-flop having a reset function, and may be reset according to the control signal SC2 so as to reset a set value or parameter of the digital circuit.

Figure 4B:
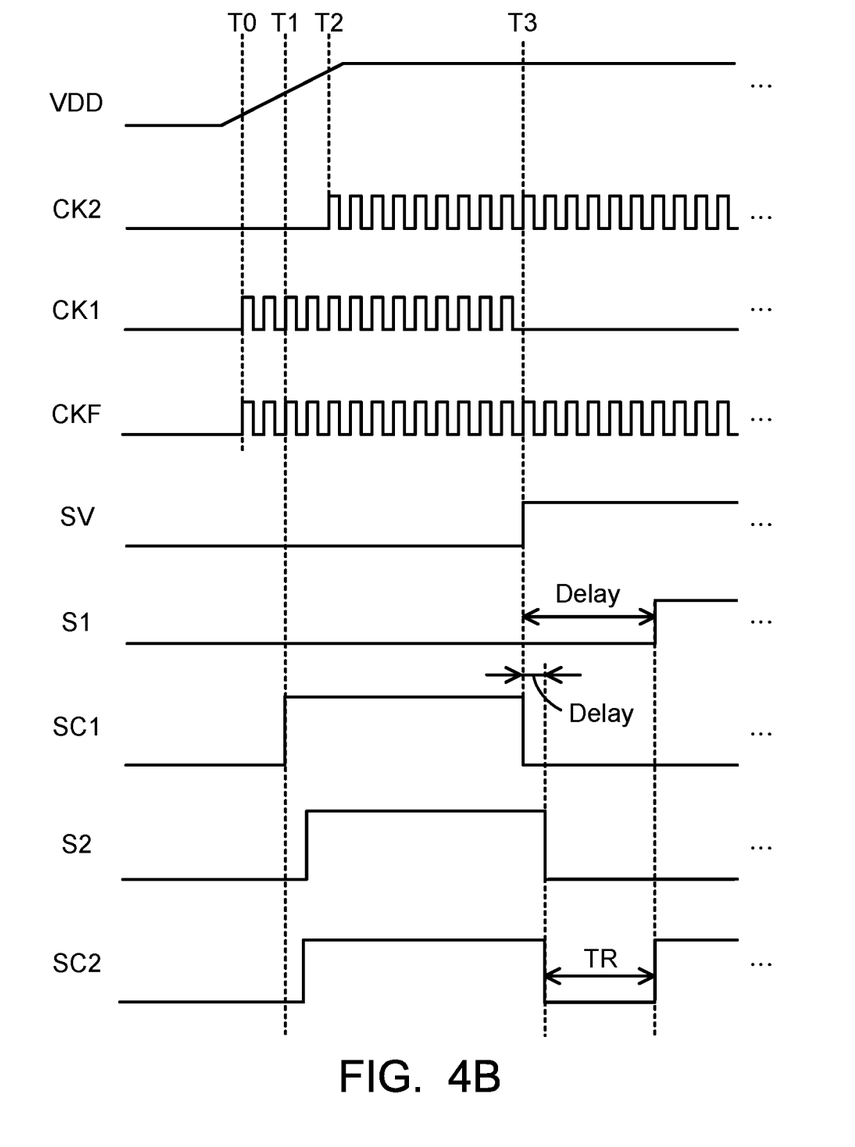
FIG. 4B is a timing schematic diagram of a clock generator device in FIG. 4A according to some embodiments of the disclosure.

The operation of the clock generator device 400 is given with reference to FIG. 4B. FIG. 4B shows a timing schematic diagram of the clock generator circuit 400 in FIG. 4A according to some embodiments of the present invention. After powering on the clock generator device 400, at a timing T0, the clock generator circuit 110 outputs the clock signal CK1, and the selection circuit 140 outputs the clock signal CK1 as the final clock signal CKF. At a timing T1, the detector circuit 150 determines that the clock generator circuit 110 is capable of stably outputting the clock signal CK1, and outputs the control signal SC1 having a second logic value (corresponding to a high level). At a timing T2, the clock generator circuit 120 outputs the clock signal CK2. At a timing T3, the detector circuit 130 determines that the clock generator circuit 120 is capable of stably outputting the appropriate clock signal CK2, and outputs the validation signal SV having a second logic value (corresponding to a high level). In response to the validation signal SV, the clock generator circuit 110 is turned off and stops outputting the clock signal CK1. Under such condition, the detector circuit 150 determines that the clock generator circuit 110 does not output the clock signal CK1, and outputs the control signal SC1 having a first logic value (corresponding to a low level). The delay circuit 410 delays the validation signal SV to output the signal S1. The delay circuit 420 delays the control signal SC1 to output the signal S2. The logic gate circuit 310 generates the control signal SC2 according to the signal S1 and the signal S2. With the configuration above, as shown in FIG. 4B, the control signal S2 has a reset period TR. During the reset period TR, a part of the operation of a digital circuit of the RTC circuit is reset. As such, a part of the operation of the digital circuit is prevented from being affected (for example, by glitch) by the switching process of clock signals, further enhancing overall operation stability of the system.

Figure 5:
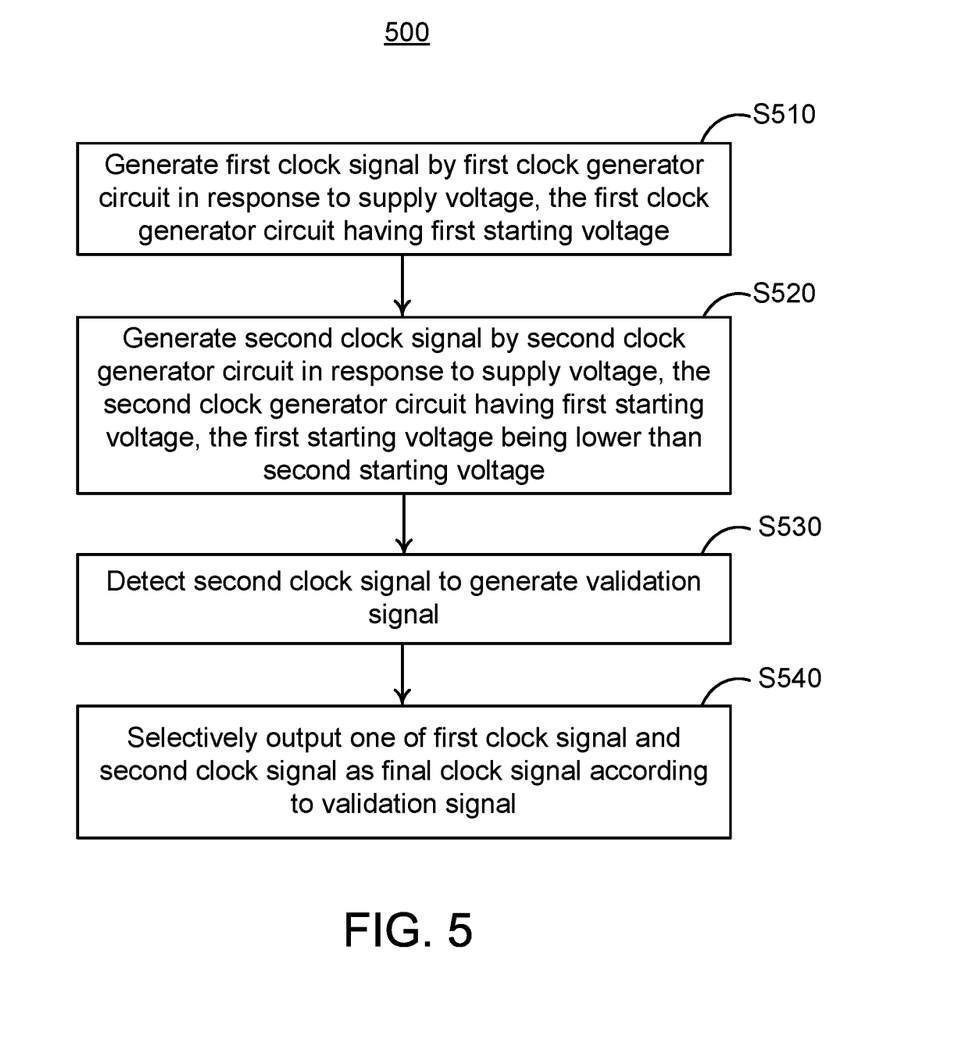
FIG. 5 is a flowchart of a clock generation method according to some embodiments of the disclosure.

FIG. 5 shows a flowchart of a clock generation method 500 according to some embodiments of the present invention. In some embodiments, the clock generation method 500 may be performed by, for example but not limited to, the clock generator device in FIG. 1A, FIG. 1B, FIG. 3 or FIG. 4.

In operation S510, a first clock signal is generated by a first clock generator circuit in response to a supply voltage, wherein the first clock generator circuit has a first starting voltage. In operation S520, a second clock signal is generated by a second clock generator circuit in response to the supply voltage, wherein the second clock generator circuit has a second starting voltage, and the first starting voltage is lower than the second starting voltage. In operation S530, the second clock signal is detected to generate a validation signal. In operation S540, one of the first clock signal and the second clock signal is selectively outputted as a final clock signal according to the validation signal.

Details of operation S510 to operation S540 may be referred from the embodiments above, and the repeated details are omitted herein. The multiple operations of the clock generation method 500 are merely examples, and are limited to being performed in the order of this example. Without conflicting with the operation means or ranges of the embodiments of the disclosure, various operations in the clock generation method 500 may be appropriately added, substituted, omitted, or performed in a different order. Alternatively, one or more operations of the clock generation method 500 may be simultaneously performed or simultaneously performed in part.

In conclusion, the clock generator device and the clock generation method according to some embodiments of the disclosure are capable of more quickly outputting clock signals so as to accelerate the operation start timing of the system. Thus, operation start timings of circuits or chips related to an application of an RTC may be shortened.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A clock generator device, comprising:
a first clock generator circuit, having a first starting voltage, generating a first clock signal in response to a supply voltage;
a second clock generator circuit, having a second starting voltage, generating a second clock signal in response to the supply voltage, wherein the first starting voltage is lower than the second starting voltage;
a first detector circuit, detecting the second clock signal to generate a validation signal;
a selection circuit, selectively outputting one of the first clock signal and the second clock signal according to the validation signal;
a second detector circuit, detecting the first clock signal to generate a first control signal;
a first delay circuit, for delaying the validation signal to generate a first signal;
a second delay circuit, for delaying the first control signal to generate a second signal; and
a logic gate circuit, for generating a second control signal according to the first signal and the second signal;
wherein, a delay time of the first delay circuit is less than a delay time of the second delay circuit.

2. The clock generator device according to claim 1, wherein the validation signal is for controlling the first clock generator circuit.

3. The clock generator device according to claim 1, further comprising:
a logic gate circuit, generating a second control signal according to the validation signal and the first control signal, wherein the second control signal is for controlling a digital circuit.

4. The clock generator device according to claim 1, wherein when the supply voltage is equal to or greater than the first starting voltage, the first clock generator circuit starts to generate the first clock signal, and when the supply voltage is equal to or greater than the second starting voltage, the second clock generator circuit starts to generate the second clock signal.

5. The clock generator device according to claim 1, wherein the first detector circuit comprises:
a current source, for providing a current signal;
a switch, being selectively turned on according to the second clock signal;
a capacitor, charged via the current signal and discharged via the switch to generate a detection signal; and
an inverter, for outputting the validation signal according to the detection signal.

6. The clock generator device according to claim 1, wherein the first detector circuit comprises:
a counter, for counting the second clock signal to generate a counter value; and
a comparator, for outputting the validation signal when the counter value is equal to a threshold.

7. The clock generator device according to claim 1, wherein the first clock generator circuit is a free-running oscillator, and the second clock generator circuit is a quartz oscillator.

8. A clock generation method, comprising:
generating a first clock signal by a first clock generator circuit in response to a supply voltage, the first clock generator circuit having a first starting voltage;
generating a second clock signal by a second clock generator circuit in response to the supply voltage, the second clock generator circuit having a second starting voltage, wherein the first starting voltage is lower than the second starting voltage;
detecting the second clock signal to generate a validation signal; and
selectively outputting one of the first clock signal and the second clock signal according to the validation signal;
detecting the first clock signal by a second detector circuit to generate a first control signal;
delaying the validation signal by a first delay circuit to generate a first signal;
delaying the first control signal by a second delay circuit to generate a second signal; and
generating a second control signal by a logic gate circuit according to the first signal and the second signal;
wherein, a delay time of the first delay circuit is less than a delay time of the second delay circuit.

* * * * *